United States Patent
Swami

(10) Patent No.: US 11,720,450 B2
(45) Date of Patent: Aug. 8, 2023

(54) VIRTUAL MACHINE FILE RETRIEVAL FROM DATA STORE

(71) Applicant: Druva Inc., Santa Clara, CA (US)

(72) Inventor: Uday Swami, Pune (IN)

(73) Assignee: Druva Inc., Santa Clara, CA (US)

( * ) Notice: Subject to any disclaimer, the term of this patent is extended or adjusted under 35 U.S.C. 154(b) by 64 days.

(21) Appl. No.: 17/138,707

(22) Filed: Dec. 30, 2020

(65) Prior Publication Data

US 2021/0303418 A1    Sep. 30, 2021

(30) Foreign Application Priority Data

Mar. 27, 2020  (IN) .............................. 202041013508

(51) Int. Cl.
| | | |
|---|---|---|
| *G06F 7/00* | (2006.01) | |
| *G06F 17/00* | (2019.01) | |
| *G06F 11/14* | (2006.01) | |
| *G06F 9/455* | (2018.01) | |
| *G06F 16/13* | (2019.01) | |
| *G06F 16/11* | (2019.01) | |

(52) U.S. Cl.
CPC ...... *G06F 11/1469* (2013.01); *G06F 9/45558* (2013.01); *G06F 11/1464* (2013.01); *G06F 16/128* (2019.01); *G06F 16/13* (2019.01); *G06F 2009/45583* (2013.01); *G06F 2009/45595* (2013.01); *G06F 2201/84* (2013.01)

(58) Field of Classification Search
None
See application file for complete search history.

(56) References Cited

U.S. PATENT DOCUMENTS

| | | | | |
|---|---|---|---|---|
| 2016/0077926 A1* | 3/2016 | Mutalik | .............. | G06F 16/1844 711/162 |
| 2016/0274930 A1* | 9/2016 | Mani | .................... | G05B 19/042 |
| 2021/0049079 A1* | 2/2021 | Kumar | ................ | G06F 9/45558 |

* cited by examiner

Primary Examiner — Tuan A Pham
(74) Attorney, Agent, or Firm — Fenwick & West LLP

(57) ABSTRACT

A system includes a data management server and a data store. The data store uses an external file system to store data block of a client virtual machine. The client virtual machine uses an internal file system. The data management server comprises a proxy agent and a staging virtual machine. In response to receiving a request to retrieve a file indexed by the client virtual machine, the proxy agent imports data of the internal file system to a staging virtual machine. The proxy agent determines an internal file address that corresponds to the requested file. The staging virtual machine translates the internal file address to an external file address of the external file system. The staging virtual machine retrieves the file stored in the data store based on the external file address. The staging virtual machine provides the retrieved file to the target device.

17 Claims, 9 Drawing Sheets

Disk Locations in Data Store: 0 → 1000
Volume 1 Locations: 0 → 500
Volume 2 Locations: 0 → 500
Volume 1 and Volume 2 make up Disk Locations in Data Store At 8:00 pm:

| Data Stored | File A Location | Volume 2 Location | Disk Location |
| --- | --- | --- | --- |
| AA | 0 | 12 | 512 |
| BB | 1 | 14 | 514 |
| CC | 2 | 22 | 522 |
| DD | 3 | 25 | 525 |

At 8:05 pm:

| Data Stored | File A Location | Volume 2 Location | Disk Location |
| --- | --- | --- | --- |
| AA | 0 | 12 | 512 |
| BB → BC | 1 | 14 | 514 |
| BB |  | 30 | 530 |
| CC | 2 | 22 | 522 |
| DD | 3 | 25 | 525 |

File A at 8:00 pm stored at Volume 2 Locations: 12 → 14 → 22 → 25
File A at 8:05 pm stored at Volume 2 Locations: 12 → 30 → 22 → 25

At 8:10 pm, request received for retrieving File A snapshot taken at 8:00pm. Volume 2 locations 12 → 30 → 22 → 25 are converted to disk locations 512 → 530 → 522 → 525.
File A retrieved from data store at Disk Locations.

*FIG. 7*

VIRTUAL MACHINE FILE RETRIEVAL FROM DATA STORE

CROSS REFERENCE TO RELATED APPLICATIONS

This application claims the benefit of priority to Indian Provisional Patent Application No.: 202041013508, filed on Mar. 27, 2020, which is incorporated herein by reference in its entirety for all purposes.

TECHNICAL FIELD

The disclosed embodiments are related to data management systems, and, more specifically, to data management servers that may retrieve one or more virtual machine files.

BACKGROUND

To protect against data loss, organizations may periodically backup data to a backup system and restore data from the backup system. In some cases, the backup data may comprise a disk snapshot of a virtual machine. The disk snapshot captures the disk file system and the files stored on it. The disk snapshot may be stored in a data store external to the virtual machine. Conventionally, to restore one or more individual files of the disk snapshot, the entire disk snapshot would be restored. However, restoring the entire disk snapshot is time consuming and accrues unnecessary data transfer costs.

BRIEF DESCRIPTION OF THE DRAWINGS

FIG. 7 illustrates a file retrieval from a disk location, in accordance with an embodiment.

Figure 1:
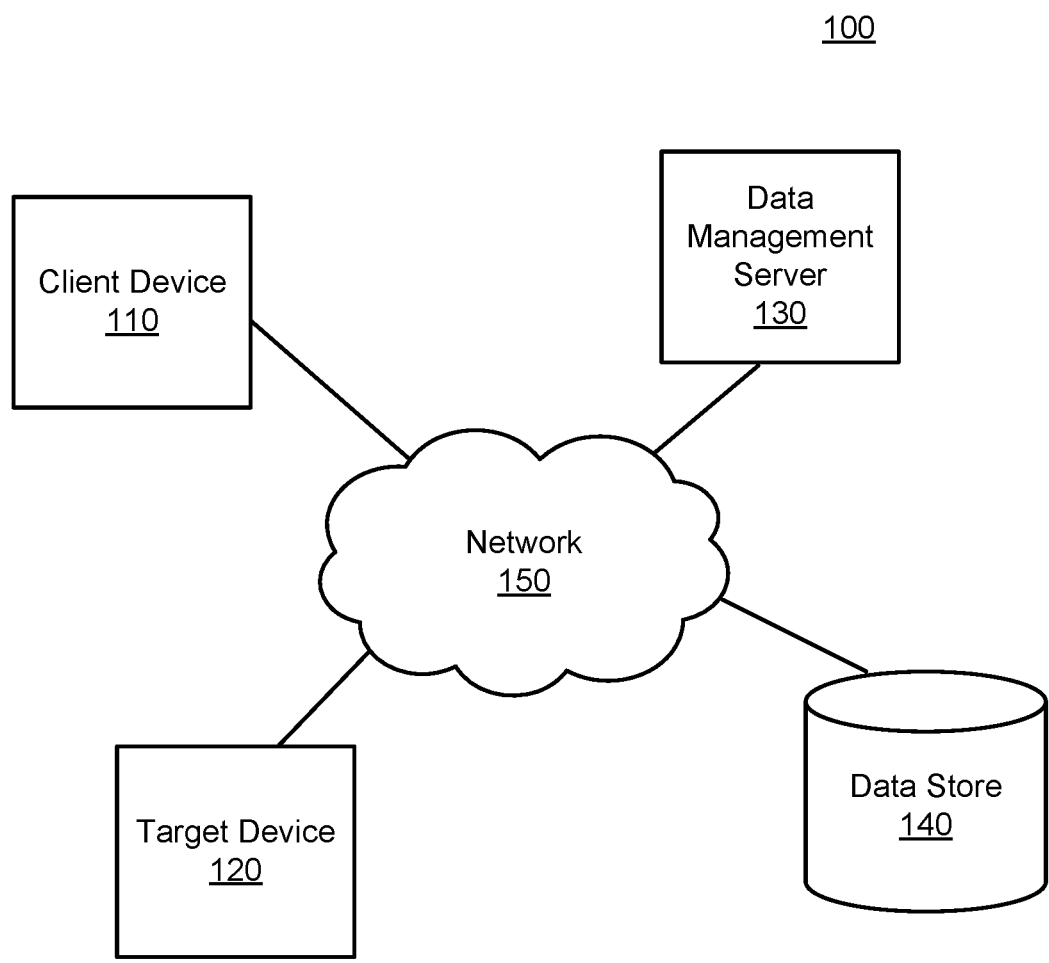
FIG. 1 is a block diagram illustrating a system environment of an example data management system, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures (FIGs.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed are example embodiments related to systems and processes of data retrieval and/or restorations associated with files in virtual machines that improve the efficiency and cost of performing such restorations. Backup snapshots of a virtual machine stored in a client device may periodically be captured and sent to a data store for storage. The snapshots may include individual files. A separate or the same client device may request to retrieve one or more individual files from the data store. In order to accommodate the request, a data management server may determine a location (e.g., an address) of the individual file in the data store. However, an address, a file directory, or otherwise a file identifier included in the client's request to retrieve a file may not be immediately translatable to the precise location used in the data store. For example, the request may include a file directory used in a virtual machine to identify the file to be restored. In many cases, without a restoration of the entire virtual machine, such file directory used in the virtual machine may not be immediately mappable to an address used by the data store, which could be used to store many different types of files from various clients.

In accordance with an embodiment, to further improve the efficiency of the restoration process in restoring a file in a virtual machine, a data management server may determine an internal file address of the requested file. The internal file address may be the location of the requested file as indexed by the client virtual machine in an internal file system of the client virtual machine. The data management server may set up a staging virtual machine that can process the internal file system of the client virtual machine. By using the staging virtual machine, in some cases not the entire client virtual machine needs to be retrieved and/or restored in order to determine a precise mapping of file addresses. In turn, the data management server may translate the internal file address to an external file address. The external file address is the location of the requested file as indexed by the data store. The data management server may retrieve the requested file using the external file address and provide the requested file to the requesting client.

The processes described may decrease the costs associated with data retrieval and/or data restoration. Costs may be direct monetary costs to be spent to perform an action (e.g., read, write, store) or other costs such as computer resources and time in performing an action. The retrieval and restoration of individual files, as opposed to entire disk snapshots, provides a less costly method for data restoration.

Example System Environment

FIG. 1 is a block diagram illustrating a system environment 100 of an example data management system, in accordance with an embodiment. By way of example, the system environment 100 may include a client device 110, a target device 120, a data management server 130, a data store 140, and a network 150. In various embodiments, the data management system 100 may include fewer and additional components that are not shown in FIG. 1.

The various components in the data management system 100 may each correspond to a separate and independent entity or some of the components may be controlled by the same entity. For example, in one embodiment, the data management server 130 and the data store 140 may be controlled and operated by the same data storage provider company while the client device 110 and target device 120 may be controlled by an individual client. In another embodiment, the data management server 130 and the data store 140 may be controlled by separate entities. For example, the data management server 130 may be an entity that utilizes various popular cloud data service providers as data stores 140. The components in the data management system 100 may communicate through the network 150. In some cases, some of the components in the environment 100 may also communicate through local connections. For example, the data management server 130 and the data store 140 may communicate locally. In another example, the client device 110 and the target device 120 may communicate locally.

A client device 110 may be a computing device that can transmit and/or receive data via the network 150. Users may use the client device to perform functions such as accessing, storing, creating, and modifying files, accessing digital content, and executing software applications. The client device 110 may have one or more virtual machines installed. A client device 110 may send a request to store, read, search, delete, modify, and/or restore data (e.g., virtual machine data) stored in the data store 140. Data of a client device 110 may be captured as one or more snapshots of the client device 110 and be stored in the data store 140. The client may be referred to as a user or an end user of the data management server 130. The client device 110 also may be referred to as a user device or an end user device. The client device 110 may be any computing device. Examples of such client devices 110 include personal computers (PC), desktop computers, laptop computers, tablets (e.g., iPADs), smartphones, wearable electronic devices such as smartwatches, or any other suitable electronic devices. The clients may be of different natures such as including individual end users, organizations, businesses, and other clients that use different types of client devices (e.g., target devices) that run on different operating systems.

A target device 120 may be a computing device that can transmit and/or receive data via the network 150. The target device 120 may be substantially similar to and perform the same functions as the client device 110. A target device 120 may send a request to read, search, and/or restore data stored in the data store 140, such as one or more files in a virtual machine installed in the client device 110. In one embodiment, a user of the target device 120 may be the client or an end user of the data management server 130. In one embodiment, the target device 120 may be the same as the client device 110. For example, data of the client device 110 may have been erased and the client device 110 now requests the data management server 130 to restore one or more files or the entire virtual machine originally stored in the client device 110. In another embodiment, the target device 120 and the client device 110 are different devices that may or may not be controlled by the same client. For example, in one case, a client who has control of both the target device 120 and the client device 110 may want to put copies of one or more files of a virtual machine stored in the client device 110 into the target device 120. In another example, the target device 120 and the client device 110 may be controlled by different individuals. The virtual machine in the client device 110 may include a database (e.g., SQL database) and the target device 120 may request a file using a SQL query.

Figure 8:
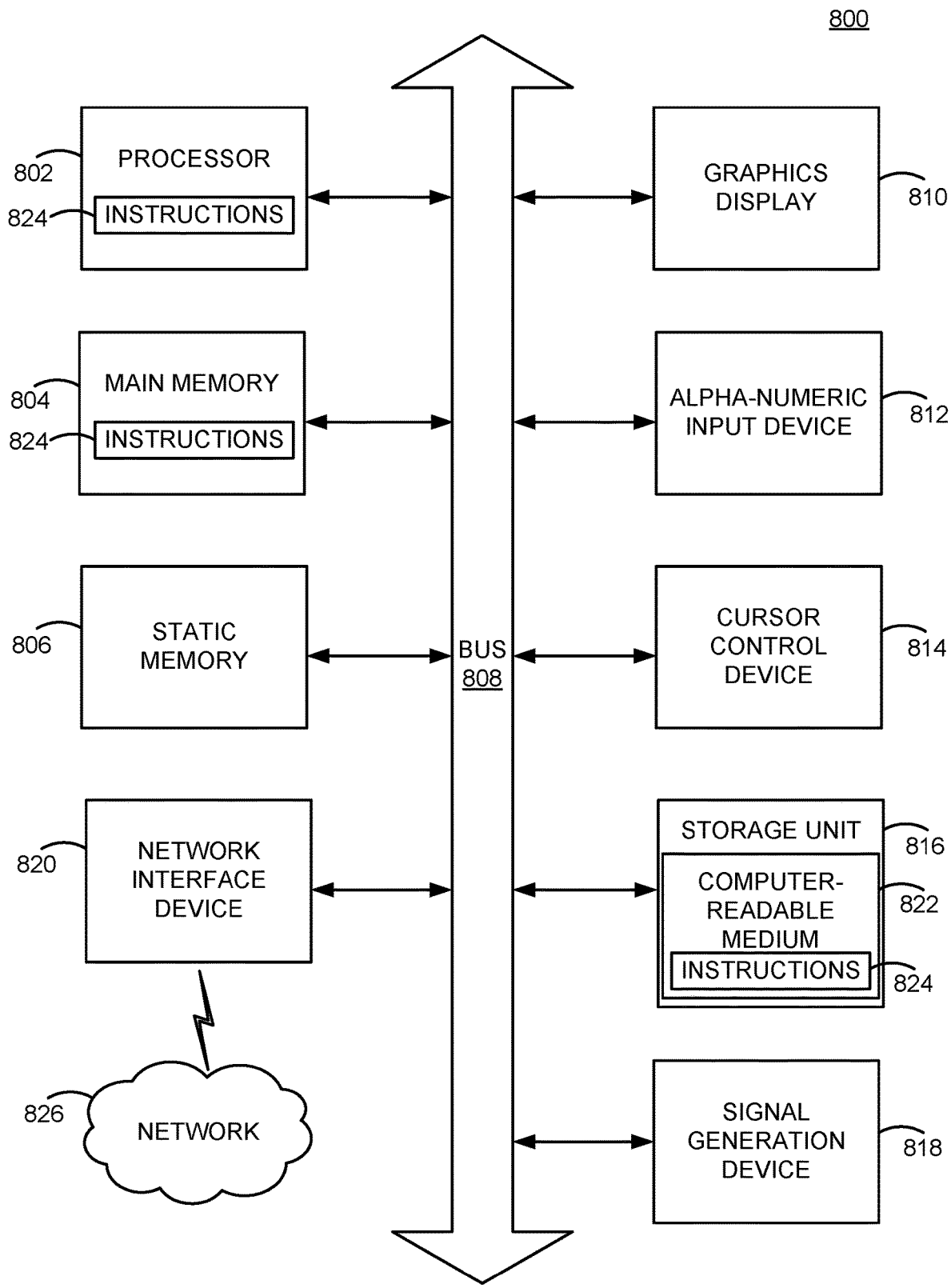
FIG. 8 is a block diagram illustrating components of an example computing machine, in accordance with an embodiment.

The client device 110 and the target device 120 may take the form of software, hardware, or a combination thereof (e.g., some or all of the components of a computing machine of FIG. 8).

A data management server 130 may include one or more computing devices that manages data of the data management system 100. The operator of the data management server 130 may provide software platforms (e.g. online platforms), software applications for installation in the client device 110, application programming interfaces (APIs) for clients to manage backup and restoration of data, etc. In one embodiment, the data management server 130 manages data of the client device 110 that is stored in the data store 140. For example, the data management server 130 may transmit data to and/or from the client device 110. In another embodiment, the data management server 130 manages data of the data store 140 that is retrieved and restored in the target device 120. For example, the data management server 130 may transmit data to and/or from the target device 120. In this disclosure, data management servers 130 may collectively and singularly be referred to as a data management server 130, even though the data management server 130 may include more than one computing device. For example, the data management server 130 may be a pool of computing devices that may be located at the same geographical location (e.g., a server room) or distributed geographically (e.g., cloud computing, distributed computing, or in a virtual server network).

A computing device of the data management server 130 may take the form of software, hardware, or a combination thereof (e.g., some or all of the components of a computing machine of FIG. 8). For example, parts of the data management server 130 may be a PC, a tablet PC, a smartphone, an internet of things (IoT) appliance, or any machine capable of executing instructions that specify actions to be taken by that machine. Parts of the data management server 130 may include one or more processing units and a memory.

The data store 140 may communicate with the client device 110 via the network 150 for capturing and restoring snapshots and/or files of a client device 110. The data store 140 may also work with the data management server 130 to cooperatively perform data transmission of data on the target device 120. The data store 140 may include processes running in the data store 140. The data store 140 may include one or more storage units such as memory that may take the form of non-transitory and non-volatile computer storage medium to store various data. The data store 140 may also be referred to as cloud storage servers. Example cloud storage service providers may include AMAZON AWS, DROPBOX, RACKSPACE CLOUD FILES, AZURE BLOB STORAGE, GOOGLE CLOUD STORAGE, etc. In other cases, instead of cloud storage servers, the data store 140 may be a storage device that is controlled and connected to the data management server 130. For example, the data store 140 may be memory (e.g., hard drives, flash memory, discs, tapes, etc.) used by the data management server 130.

The data store 140 may use different data storage architectures to manage and arrange the data. The data storage framework for the data store 140 may sometimes be referred to as an external file system in this disclosure, as opposed to a file system that is internal to a virtual machine. A file system defines how an individual computer or system organizes its data, where the computer stores the data, and how the computer monitors where each file is located. A file system may include file directories. In some cases, the external file system may manage data as a file hierarchy. In another example, the external file system may take the form of an object storage system and manage data as objects. In some embodiments, the external file system may manage data as blocks within sectors and tracks. With block storage, files are split into blocks (evenly sized or not) of data, each with its own address. Block storage may be used for most applications, including file storage, snapshot storage, database storage, virtual machine file system (VMFS) volumes, etc.

Each file stored in the data store 140 may include metadata. Metadata is data that describes a file, such as a timestamp, version identifier, file directory including timestamp of edit or access dates, ACL checksums, journals including timestamps for change event, etc.

The communications among the client device 110, the target device 120, the data management server 130, and the data store 140 may be transmitted via a network 150, for example, via the Internet. The network 150 provides connections to the components of the system 100 through one or more sub-networks, which may include any combination of local area and/or wide area networks, using both wired and/or wireless communication systems. In one embodiment, a network 150 uses standard communications technologies and/or protocols. For example, a network 150 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 150 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 150 may be represented using any suitable format, such as hypertext markup language (HTML), extensible markup language (XML), or JSON. In some embodiments, all or some of the communication links of a network 150 may be encrypted using any suitable technique or techniques such as secure sockets layer (SSL), transport layer security (TLS), virtual private networks (VPNs), Internet Protocol security (IPsec), etc. The network 150 also includes links and packet switching networks such as the Internet.

Example Client Device Architecture

Figure 2:
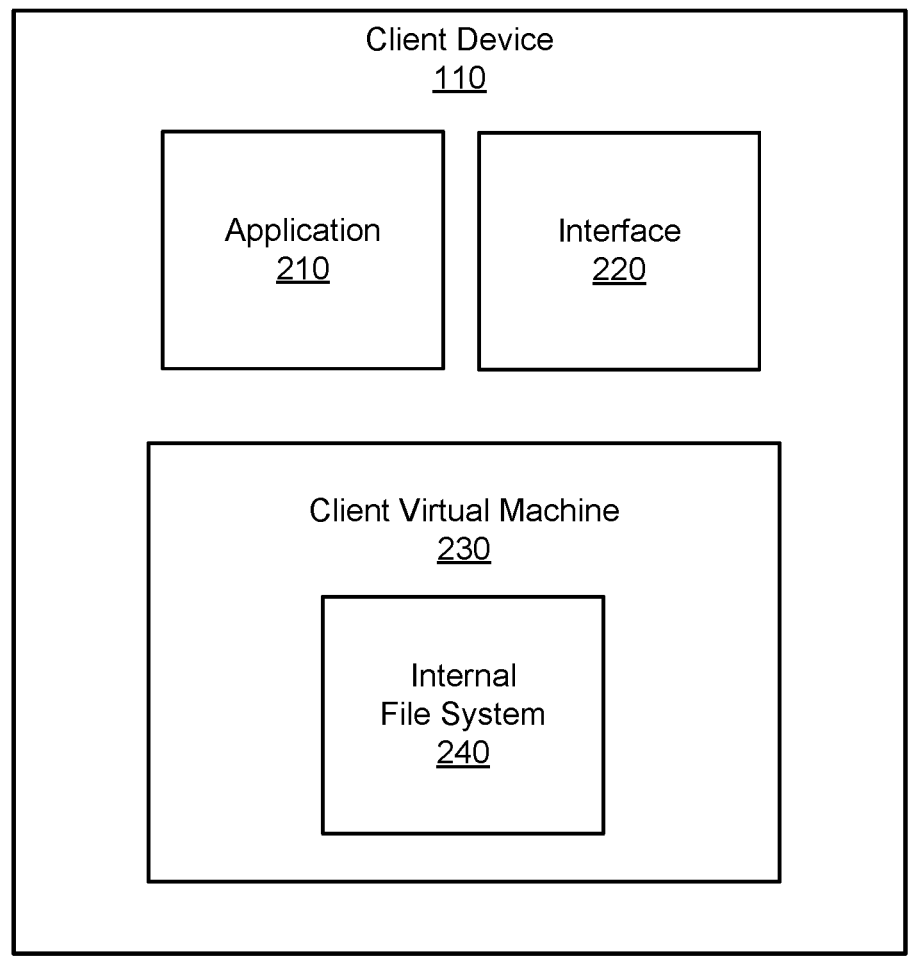
FIG. 2 is a block diagram illustrating an architecture of an example client device, in accordance with an embodiment.

FIG. 2 is a block diagram illustrating an architecture of an example client device 110, in accordance with an embodiment. An example of detailed hardware architecture of the client device 110 is illustrated in FIG. 8. The client device 110 may include one or more applications 210 (collectively referred to as applications 210 or an application 210), one or more user interfaces 220 (collectively referred to as user interfaces 220 or a user interface 220), and a client virtual machine 230. In some embodiments, the client device 110 may include additional, fewer, or different components for various applications. The functions of the client device 110 may be distributed among the components in a different manner than described.

The applications 210 may be any suitable software applications that operate at the client device 110. The applications 210 may be of different types. In one case, an application 210 may be a web application that runs on JavaScript or other alternatives, such as TypeScript, etc. In the case of a web application, the application 210 cooperates with a web browser to render a front-end user interface 220. In another case, an application 210 may be a mobile application. For example, the mobile application may run on Swift for iOS and other APPLE operating systems or on Java or another suitable language for ANDROID systems. In yet another case, an application 210 may be a software program that operates on a desktop computer that runs on an operating system such as LINUX, MICROSOFT WINDOWS, MAC OS, or CHROME OS.

In one embodiment, an example application 210 may be provided and controlled by the data management server 130. For example, the company operating the data management server 130 may be a data storage service provider that provides a front-end software application that can be installed, ran, or displayed at a client device 110. The application 210 provided by the data management server 130 may automatically perform or allow the user to perform various data management tasks such as capturing one or more snapshots of a device, scheduling capturing of snapshots, facilitating manual backup, uploading, downloading of files, restoring one or more snapshots of a device, and other data management tasks. The application 210 provided by the data management server 130 may take various forms such as software as a service (SaaS), downloadable applications, free applications, etc. In one case, an example application 210 may be installed at a client device 110 as a background application that performs periodic backup operations and provides additional task options when its user interface 220 is launched. In another case, an application 210 is published and made available by the company operating the data management server 130 at an application store (App store) of a mobile operating system. In yet another case, an end user may go to the company's website and launch a web application for various data management tasks such as backup, snapshot management, or restoration.

The user interfaces 220 may be any suitable interfaces for receiving inputs from users and for communication with users. When a client device 110 attempts to perform a data management task, the user may communicate to the application 210 and the data management server 130 through the user interface 220. The user interface 220 may take different forms. In one embodiment, the user interface 220 may be a web browser such as CHROME, FIREFOX, SAFARI, INTERNET EXPLORER, EDGE, etc. and the application 210 may be a web application that is run by the web browser. In another application, the user interface 220 is part of the application 210. For example, the user interface 220 may be the front-end component of a mobile application or a desktop application. The user interface 220 also may be referred to as a graphical user interface (GUI) which includes graphical elements to display files such as spreadsheets. In another embodiment, the user interface 220 may not include graphical elements but may communicate with the data management server 130 via other suitable ways such as application program interfaces (APIs).

The client virtual machine 230 is a software program that runs applications and an operating system. The client virtual machine 230 may be a guest-created virtualization software within the computing environment of the host, the client device 110. Virtual machines may include any suitable emulators, hypervisors, and other suitable virtualization application on various levels such as hardware level, operating system level, desktop level, application level, network level, etc. Example virtual machines includes virtual PCs, virtual servers, virtual workstations, containers, dockers, virtual kernels, and other virtualization applications that may or may not provide virtualization of hardware and/or operating systems. In one embodiment, the client device 110 may include a more common virtual machine such as a virtual PC. Other specific examples of virtualization software include VMWARE WORKSTATION, MICROSOFT HYPER-V MANAGER, PARALLELS DESKTOP, ACROPOLIS HYPERVISOR, HYPERVISOR DIRECT, etc. The client virtual machine 230 may provide its own virtual hardware, such as CPUs, memory including a virtual disk, hard drives, network interfaces, etc. The client virtual machine 230 may store its operating system, programs, and data files in one or more disk files of the virtual disk. The disk files may create an internal file system 240 for the client virtual machine 230. The internal file system 240 may additionally store the virtual machine disk images, including snapshots. The internal file system 240 may index the disk files and/or snapshots for storage using an internal file address system. At any time, the client device 110 may backup data stored in the internal file system 240 to a data store 140 via the data management server 130 and the network 150. Outside of a client virtual machine 230, the client virtual machine 230 is often saved as a single image or a single package of files. A system uses the internal file system 240 to determine a precise location of a file in the client virtual machine 230.

Example Data Management Server Architecture

Figure 3:
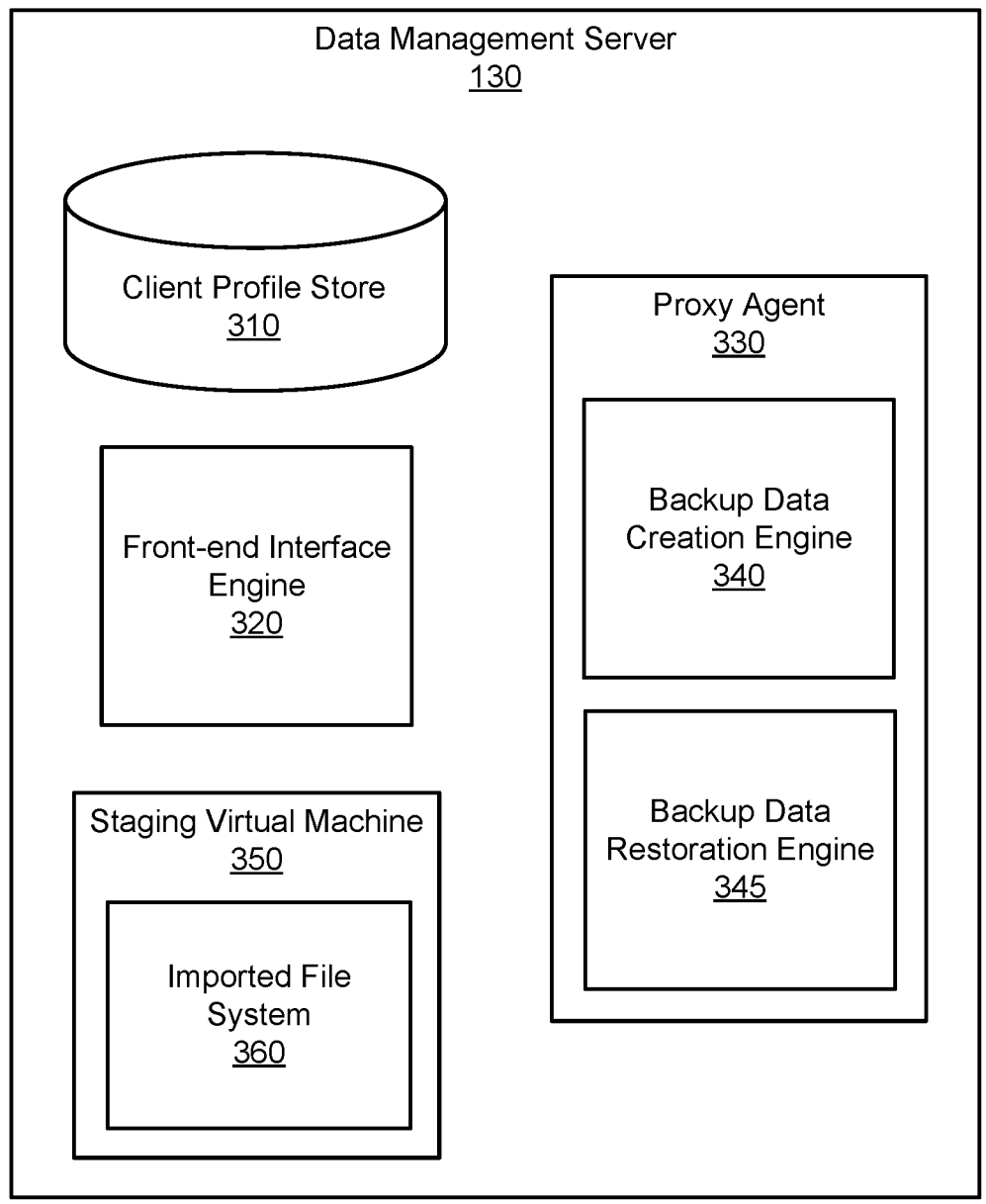
FIG. 3 is a block diagram illustrating an architecture of an example data management server, in accordance with an embodiment.

FIG. 3 is a block diagram illustrating an architecture of an example data management server 130, in accordance with an embodiment. Components of the data management server 130 may be a combination of hardware and software and may include all or a subset of the example computing system illustrated and described with FIG. 8. The data management server 130 may include a client profile store 310, a front-end interface engine 320, a proxy agent 330, and a staging virtual machine 350. In various embodiments, the data management server 130 may include fewer and additional components that are not shown in FIG. 3. For example, in some embodiments, the data store 140 may be part of the data management server 130. In other embodiments, the data store 140 may be operated by an independent party such as a cloud storage provider. In another example, other possible components such as network interfaces, security functions, load balancers, failover servers, management and network operations consoles, and the like are not shown. The functions of the data management server 130 may be distributed among the components in a different manner than described.

The client profile store 310 stores information of clients, which may include log-in credentials, profile information of clients, and information associated with client devices 110 used by the clients. Each log-in account may be associated with a client identifier that uniquely identifies a client. For example, the user account name (or a version of the user account name such as a hash of the user account) may be used as the unique client identifier of the client. The client identifier may be used to identify data to which the client has access. Data entries corresponding to the data to which the client has access may include the client identifier so that the data management server 130 can control the access of data in the data store 140. In some embodiments, each client profile in the client profile store 310 may also store the index entry identifiers of data blocks to which the client has access.

The front-end interface engine 320 may manage and operate front-end interfaces for clients to manage their files and snapshots. For example, the front-end interface engine 320 may provide a web user interface. When a client visits and logs on to the website of the data management server 130, the front-end interface engine 320 may cause the client device 110 and/or the target device 120 to display a web user interface at the web browser of the client device 110 or target device 120. The front-end interface engine 320 may control the content and information displayed on the website. The front-end interface engine 320 may display files stored in the data store 140 in the forms of graphical elements in the web user interface. In another example, the front-end interface engine 320 may communicate with and control a user interface of an application that runs at the client device 110 or at the target device 120 to control the content and information of the application. The company operating the data management server 130 may publish the application that is installed at the client device 110 or at the target device 120. The client may manage files through the user interface of the application. In yet another example, the front-end interface engine 320 may maintain an interface in the form of an application program interface (API) for the client devices 110 and/or the target device 120 to communicate with the data management server 130. The front-end interface engine 320 may also provide customer support services, such as authentication management and maintaining of client preferences.

The proxy agent 330 manages data via backups and/or restorations. For instance, the proxy agent 330 may instruct the client device 110 to take a snapshot for backup. In another example, the proxy agent 330 may instruct the data store 140 to provide a previously backed-up snapshot to a target device 120. The proxy agent 330 may be a virtual machine, a Docker, a virtual private server, a virtual kernel, or another suitable virtualization instance. In one embodiment, the proxy agent 330 may be running inside a Linux virtual machine. The proxy agent 330 may include a backup data creation engine 340 and a backup data restoration engine 345. In various embodiments, the proxy agent 330 may include fewer and additional components that are not shown in FIG. 3. For example, the proxy agent 330 may include a software interface (e.g., Filesystem in Userspace (FUSE)).

The backup data creation engine 340 may create backups of data of the client devices 110. The backup data creation engine 340 may upload the backup data to the data store 140. A backup operation may be triggered by an action performed at a client device 110 or by an event, may be scheduled as a regular backup, or may be in response to an automated backup task initiated by the data management server 130 to a client device 110. In one embodiment, the backup data creation engine 340 may poll a client device 110 periodically and receive files to be backed up and corresponding metadata, such as file names, file sizes, access time-stamps, access control information, and the like. In one embodiment, the backup data creation engine 340 may perform incremental backup operations that leverage data from previous backup cycles to reduce the amount of data to store. The backup data creation engine 340 may store the files of the client device as data blocks in the data store 140.

In one embodiment, the backup data creation engine 340 may receive snapshots of the client device 110. In some embodiments, the snapshots include snapshots of the client virtual machine 230 previously stored in the internal file system 240. A snapshot may be a set of copies of files that reflect the state of the client device 110 and/or the state of the client virtual machine 230 at the capture time (e.g., during a checkpoint). A snapshot, in one example, may be an image of the storage (or a portion of the storage) of a client device 110 that is captured at a particular moment in time. The moment in time may be referred to as a checkpoint. A snapshot may be a complete image or an incremental image. For example, an initial backup of a device may generate a snapshot that captures a complete image of a set of files in the client device 110 (e.g., a complete image of the internal file system 240). Subsequent checkpoints may generate snapshots of incremental images that represent the differential changes of the client device 110. The backup snapshot may additionally include metadata associated with the files, such as timestamps of changes, timestamps of access, ACL checksums, attribute checksums, and other like metadata. In some embodiments, a snapshot may represent a volume (e.g., a partition of a storage device) of the client device 110 (e.g., a volume of the internal file system 240). However, in other embodiments, a snapshot may only represent a portion of the client device 110 (e.g., a particular directory, a particular folder, or even a single file). The extent of file coverage of a snapshot may depend on the back settings of individual client devices 110 and may be different among various client devices 110.

In one embodiment, a snapshot may be divided into data blocks that are saved in various different locations in the data store 140. A data block may be a set of bits that represent data of a file or multiple files. Files may be of various sizes compared to a data block. For example, a large file may include multiple data blocks while a single data block may contain data of a combination of various small files. Data of a file may be retrieved by the identifiers of data blocks (e.g., an external file address, data blocks' addresses, checksums, etc.) and offsets of the starting and ending data blocks. Various individual data blocks of a snapshot may be stored in different locations of a data store 140 and sometimes may not be grouped. In some data stores 140, a data block may be started in a random location based on the checksum or another identifiable fingerprint of the data block (or the object containing the data block) as the address or identifier of the data block. Some data stores 140 use files as units to save the data instead of dividing files as data blocks that are fixed length.

The backup data restoration engine 345 may provide restoration of data stored in the data store 140 to a client device 110 and/or to a target device 120. In one embodiment, the backup data restoration engine 345 may transmit backup snapshots or individual files to a client device 110 when a client is restoring one or more files in case of events such as data loss, computer crash, version controls, or other data restoration events. In another embodiment, the backup data restoration engine 345 may transmit backup snapshots or individual files to a target device 120 when a client is requesting to retrieve and/or restore one or more files to a target device 120. In response to a request by a user of the data management server 130 to restore a file or to go back to a particular snapshot, the backup data restoration engine 345 may access the data store 140 and identify data blocks that need to be restored based on the request. In some embodiments, the identified snapshot is the latest snapshot (e.g., associated with a most recent timestamp). In other embodiments, the identified snapshot is a snapshot corresponding to a checkpoint specified by the request. The backup data restoration engine 345 transmits the identified snapshot or files to the client device 110 and/or the target device 120. Each client device 110 and target device 120 may be associated with different restoration requirements (e.g., recovery time objectives (RTO) requirements) and protocols. The backup data restoration engine 345 may restore the data for the client device 110 and/or the target device 120 based on the requirements and protocols.

The staging virtual machine 350 is a software program that runs applications and an operating system. The staging virtual machine 350 may be a virtual machine that is run at the data management server 130. The staging virtual machine may be substantially similar to the client virtual machine 230. For instance, if the client virtual machine 230 is a WINDOWS virtual machine, the staging virtual machine 350 may also be a WINDOWS virtual machine. The internal file system 240 of the client virtual machine 230 may be imported onto the staging virtual machine 350 during a retrieval and/or restoration of backup data. The imported file system 360 uses the same internal file address system of the internal file system 240. The staging virtual machine 350 uses the imported file system 360 (e.g., the internal file address system) and interprets the data included within the imported file system 360. During the retrieval of backup data, using the imported file system 360 of the staging virtual machine 350, an internal file address is translated to an external file address of the data store 140. The external file address is provided to the proxy agent 330 (e.g., to the backup data restoration engine 345). The external file address may be used to locate the requested file in the data store 140.

The various engines and components shown in FIG. 3 may be a combination of hardware and software that includes instructions, when executed by hardware components such as one or more processors, to perform the functionality.

Example Component Diagram

Figure 4:
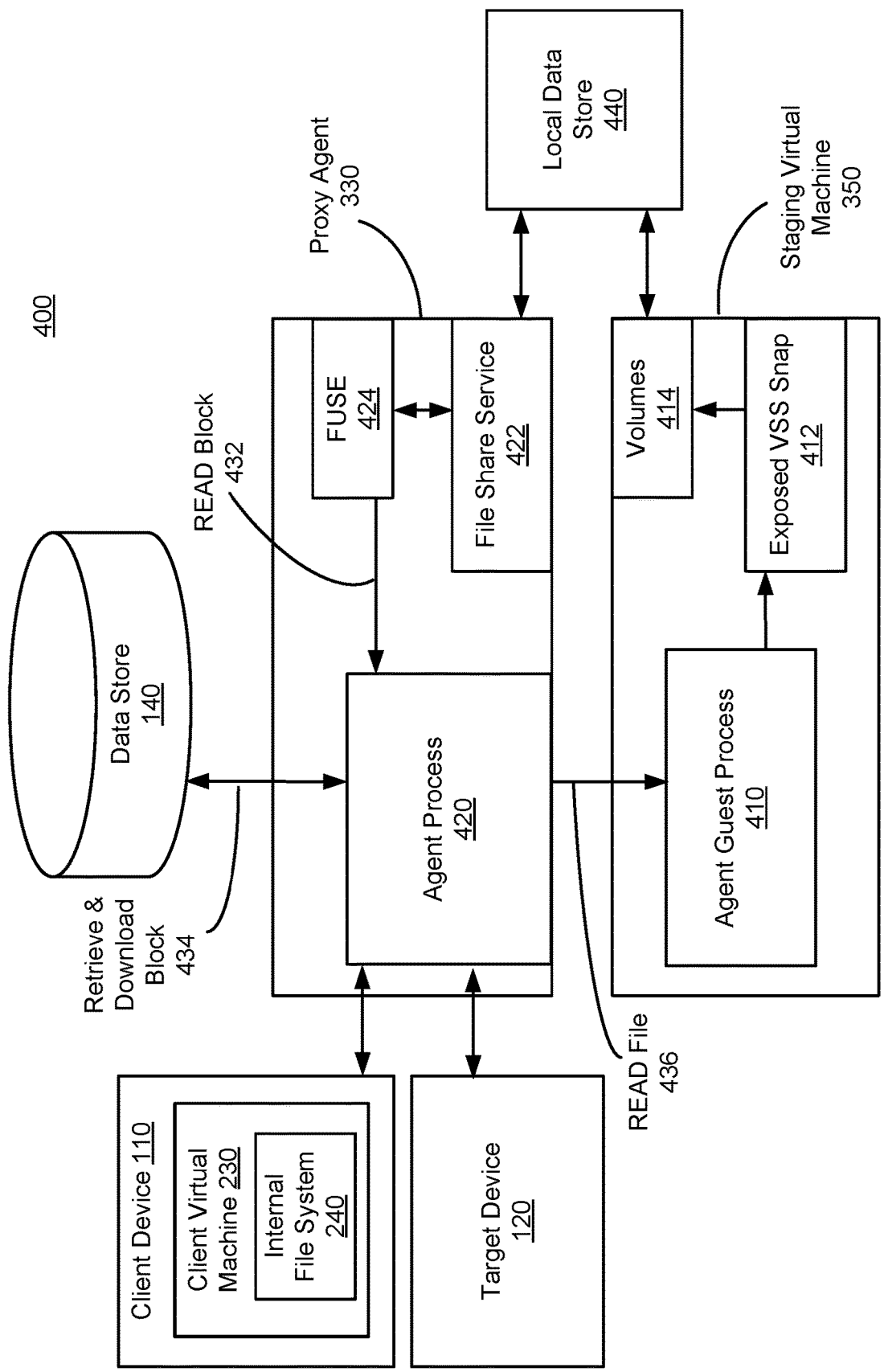
FIG. 4 is a block diagram that illustrates some components of an example data management system, in accordance with an embodiment.

FIG. 4 is a block diagram that illustrates some components of an example data management system 400, in accordance with an embodiment. The example data management system 400 may include a client device 110, a target device 120, a staging virtual machine 350, a proxy agent 330, a data store 140, and a local data store 440. In various embodiments, the data management system 400 may include fewer and additional components that are not shown in FIG. 4.

The proxy agent 330 manages data via backups and/or restorations. The proxy agent 330 may include an agent process 420, a file share service 422, and FUSE 424. The agent process 420 monitors actions and processes of the proxy agent 330. The agent process 420 communicates with the data store 140, the client device 110 and the target device 120. The file share service 422 may take the form of a distributed file system protocol that allows a user to view files on a remote computer (e.g., on the local data store 140). The file share service 422 may allow a user to store and update files on the remote computer. In one embodiment, the file share service 422 is NETWORK FILE SYSTEM (NFS). In another embodiment, the file share service 422 is SAMBA. The file share service 422 may be an example embodiment of a front-end interface engine (e.g., the front-end interface engine 320). FUSE 424 is an interface for userspace programs to export a virtual filesystem to a kernel, such as a Linux kernel. FUSE 424 may provide a secure method for non-privileged users to create and mount individual file system implementations.

The staging virtual machine 350 may be substantially similar to the client virtual machine 230 but may be resided in and controlled by data management server 130. The staging virtual machine 350 understands and can interpret the internal file system 240. The staging virtual machine 350 may include an agent guest process 410, an exposed VSS snap 412, and volumes 414. The agent guest process 410 monitors the actions and processes of the staging virtual machine 350. The exposed VSS snap 412 mounts a VSS snapshot to provide access to the data contained within the snapshot. The volumes 414 include the internal file address of a file (e.g., an internal file address of a snapshot).

The data store 140 stores various backups (e.g., files and/or snapshots of client virtual machines). The data store 140 communicates with the proxy agent 330 for retrieving and downloading 434 blocks from the data store 140 to the agent process 420. The retrieved and downloaded 434 blocks may include files and/or snapshots of the client virtual machine 230 stored at external file address locations in the data store 140.

The local data store 440 is a virtual machine dependent data store. In one embodiment, the local data store 440 is a VMWare data store attached to a VMWare host. The staging virtual machine 350 and the proxy agent 330 may access the local data store 440. During a restoration process, the local data store 440 may be accessed by the staging virtual machine 350 and may be accessed by the file share service 422 of the proxy agent 330.

The target device 120 may receive the retrieved and downloaded 434 block from the proxy agent 330. In another embodiment (not shown), the target device 120 may receive the retrieved and downloaded 434 block from the data store 140.

In a data backup process, the agent process 420 receives a request (e.g., from the data store 140) to backup the client virtual machine 230. The request to backup the client virtual machine 230 may also include a request to backup the internal file system 240. In one embodiment, in response to receiving the request, the agent process 420 injects binary (e.g., injects instructions of an agent guest process 410) in the client virtual machine 230 to take one or more snapshots of the internal file system 240 and/or the client virtual machine 230. The agent process 420 receives acknowledgement from the agent guest process 410 that the internal snapshots are complete. In another embodiment, in response to receiving the request, the agent process 420 takes one or more snapshots of the client virtual machine 230 (e.g., via a VSS command). The snapshots are sent to the data store 140 to be stored at an external file address of the data store 140.

In a data retrieval process, the agent process 420 may receive a request (e.g., from the data store 140) to retrieve a particular snapshot. Upon receiving the retrieval request, the agent process 420 injects the agent guest process 410 into the staging virtual machine 350. FUSE 424 is activated and the file share service 422 is created. The agent process 420 retrieves metadata of one or more backup disks of the client virtual machine 230 that are formerly captured. The agent process 420 creates a local data store 440 that stores the retrieved metadata of the disks. Based on the metadata, the agent process 420 via FUSE 424 creates an impression for the staging virtual machine 350 that the backup disks are available for mount and read as volumes 414. In other words, the staging virtual machine 350 is provided with data needed to mount and access the volumes 414 from the disk. The operating system of the staging virtual machine 350 detects the volumes 414 of the disks. The agent process 420 provides a command to the agent guest process 410 to expose the snapshot from the volumes 414. The snapshots are exposed in the exposed VSS snap 412.

The agent process 420 invokes a read file 436 command to read the files of the exposed VSS snap 412. The volumes 414 are associated with the internal file address of the snapshot. The internal file address is translated to an external file address in the staging virtual machine 350. The staging virtual machine 350 performs the translation using software (e.g., using the operating system of the staging virtual machine 350) and/or a driver that understands and can interpret the internal file system 240. The external file address is provided via the local data store 440 to the file share service 422. FUSE 424 requests a read block 432 to read information at the external file address. The agent process 420 retrieves and downloads 434 the snapshot from the data store 140 that is located at the external file address. The agent process 420 provides the retrieved snapshot to the target device 120. Additional files may be retrieved in a similar manner.

In an exemplary file retrieval process, a -ls command in a Linux machine will result in the operating system returning a file directory listing. The file share service 422 and/or the local data store 440 will invoke calls (e.g., read, get, etc.) for the operating system. FUSE 424 interrupts the calls and provides them to the agent process 420. The agent process 420 provides the requested file to the target device 120.

Example Data Retrieval Processes

Figure 5:
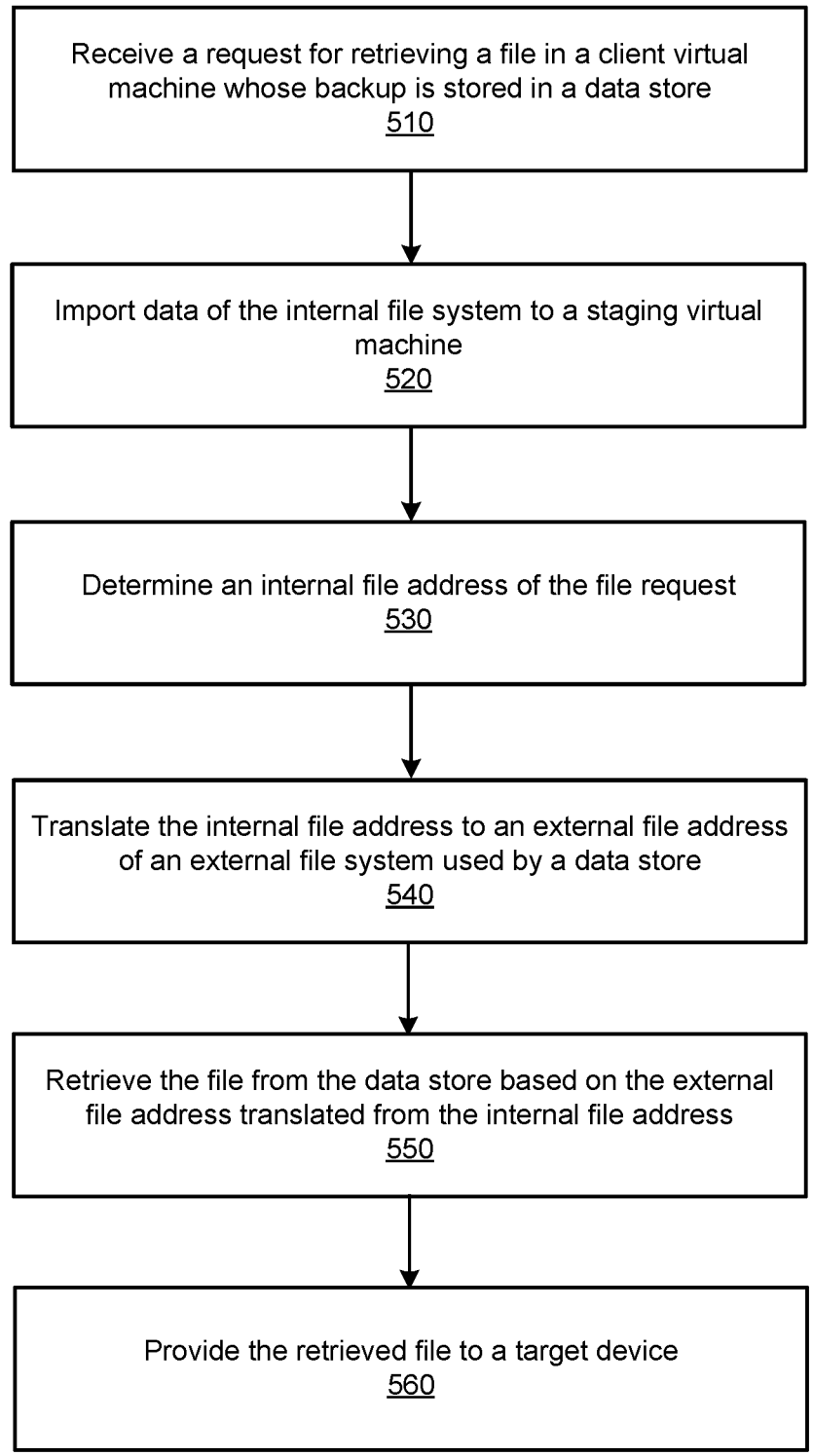
FIG. 5 is a flowchart depicting an example process of data retrieval using a data management system, in accordance with an embodiment.

FIG. 5 is a flowchart depicting an example process of data retrieval using a data management system, in accordance with an embodiment. The process may be performed to restore data for client devices (e.g., the client devices 110). In one embodiment, data is retrieved and/or restored without the client virtual machine being in operation. For example, the original client virtual machine stored in a client device may have been lost. A client attempts to retrieve one or more files from the backup of the client virtual machine without having to install the entire client virtual machine to a new computer.

In one embodiment, a data management server (e.g., the data management server 130) may capture snapshots from various client devices. The capturing of snapshots may be performed by the data management server (e.g., pulling data from client devices directly or through a backup application installed in the client devices) and may be initiated by the client devices (e.g., pushing data to the data management server or directly to a data store). The data management server may store one or more data blocks that are referenced by snapshots in a data store (e.g., the data store 140).

The data management server may receive 510 a request for retrieving a file in a client virtual machine (e.g., the client virtual machine 230) whose backup is stored in the data store. Data blocks of the client virtual machine may be stored in the data store using an external file system. The requested file may be indexed using an internal file system (e.g., the internal file system 240) internal to the client virtual machine. In one embodiment, the request for retrieving the file is part of a Structured Query Language (SQL) query. In one embodiment, the request may be initiated by a target device (e.g., the target device 120).

The data management server may import 520 data of the internal file system to a staging virtual machine (e.g., the staging virtual machine 350). The internal file system may be previously extracted or otherwise captured by the data management server when the client virtual machine is saved in a data store. In one embodiment, a proxy agent (e.g., the proxy agent 330) imports data of the internal file system to the staging virtual machine.

The data management server may determine 530 an internal file address of the file request. The internal file address being an address used by the internal file system. For example, a client may log in to an application provided by the data management server. The application may retain a graphical representation of the files and directories in the client virtual machine and the client, using the target device, may specifically request for a file. In another case, the files may also be requested through SQL queries if the files are in a SQL database. In yet another case, the target device may directly provide the file directory to the data management server.

The data management server may translate 540 the internal file address to an external file address of an external file system used by the data store using the internal file system imported to the staging virtual machine. In one embodiment, the internal file address may include an internal offset value. The internal offset value may include an internal file offset value or an internal volume offset value. The offset may be measured from zero or from some other designated value. The staging virtual machine may convert the internal offset value to an external offset value. The external offset value may indicate the external file address in the data store. In another embodiment, the internal file address may comprise a volume offset value. The volume offset value indicates the internal file address in an internal volume of the internal file system. The staging virtual machine may convert the volume offset value to a disk offset value. The disk offset value indicating the external file address in the data store.

The data management server may retrieve 550 the file stored in the data store based on the external file address translated from the internal file address. The data management server may provide 560 the retrieved file to the target device.

Example Transaction Diagrams

Figure 6A:
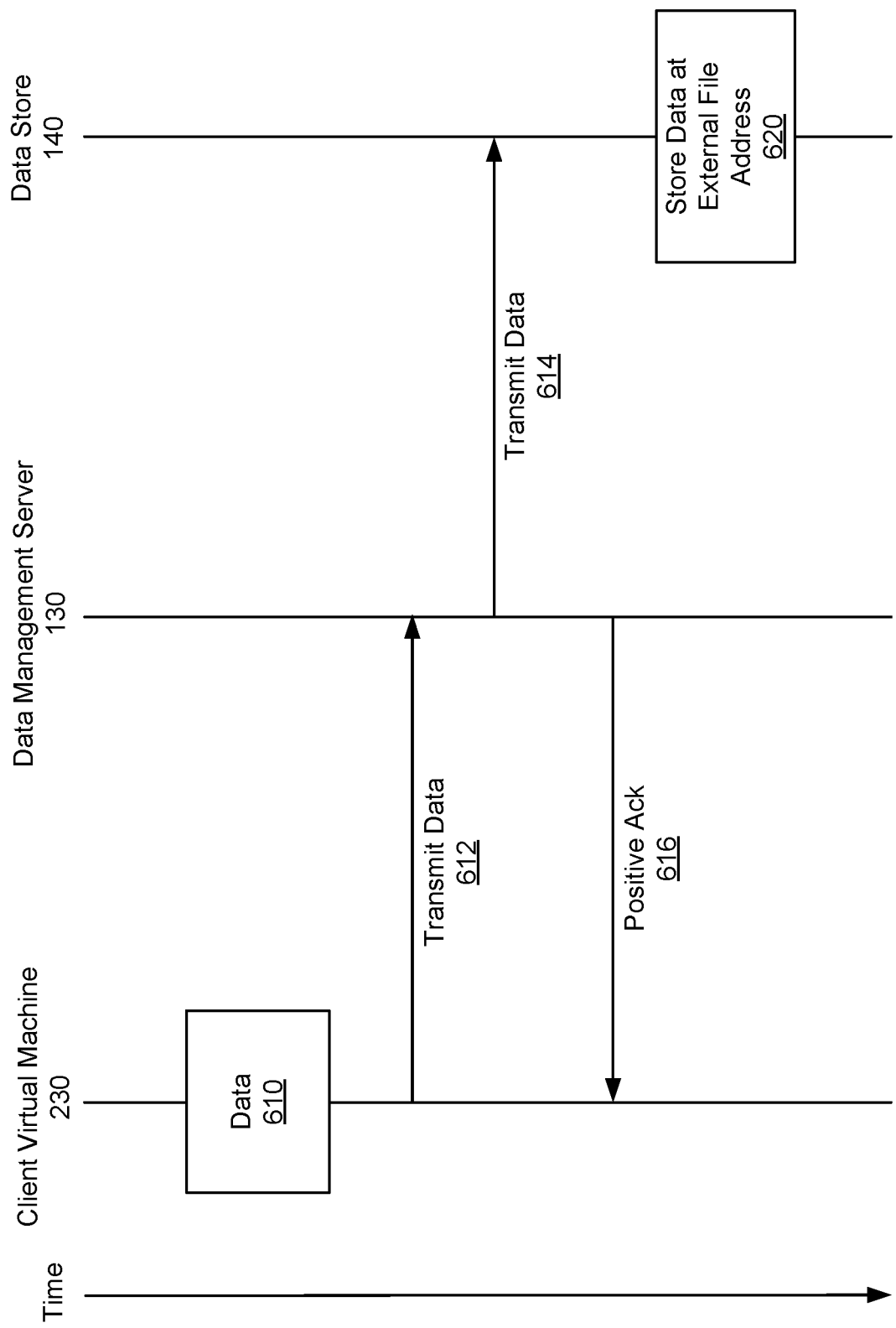
FIG. 6A is a transaction diagram illustrating interactions among a client device, a data management server, and a data store during a backup process, in accordance with an embodiment.

FIG. 6A is a transaction diagram illustrating interactions among a client device 110, a data management server 130, and a data store 140 during a backup process, in accordance with an embodiment. The client device 110 may store a client virtual machine 230 that includes an internal file system (e.g., the internal file system 240) which stores files and/or snapshots of the client virtual machine 230 as data 610. The data 610 may include metadata about the files and/or snapshots. The data 610 may be transmitted 612 to the data management server 130. In turn, the data management server 130 may transmit data 614 to the data store 140. The data management server 130 provides a positive acknowledgement 616 to the client virtual machine 230 indicating a successful transmittal of data 610 to the data store 140. The data store 140 stores 620 the data 610 at an external file address (e.g., at a block address, at a disk address, etc.) that is specific to the data store 140.

Figure 6B:
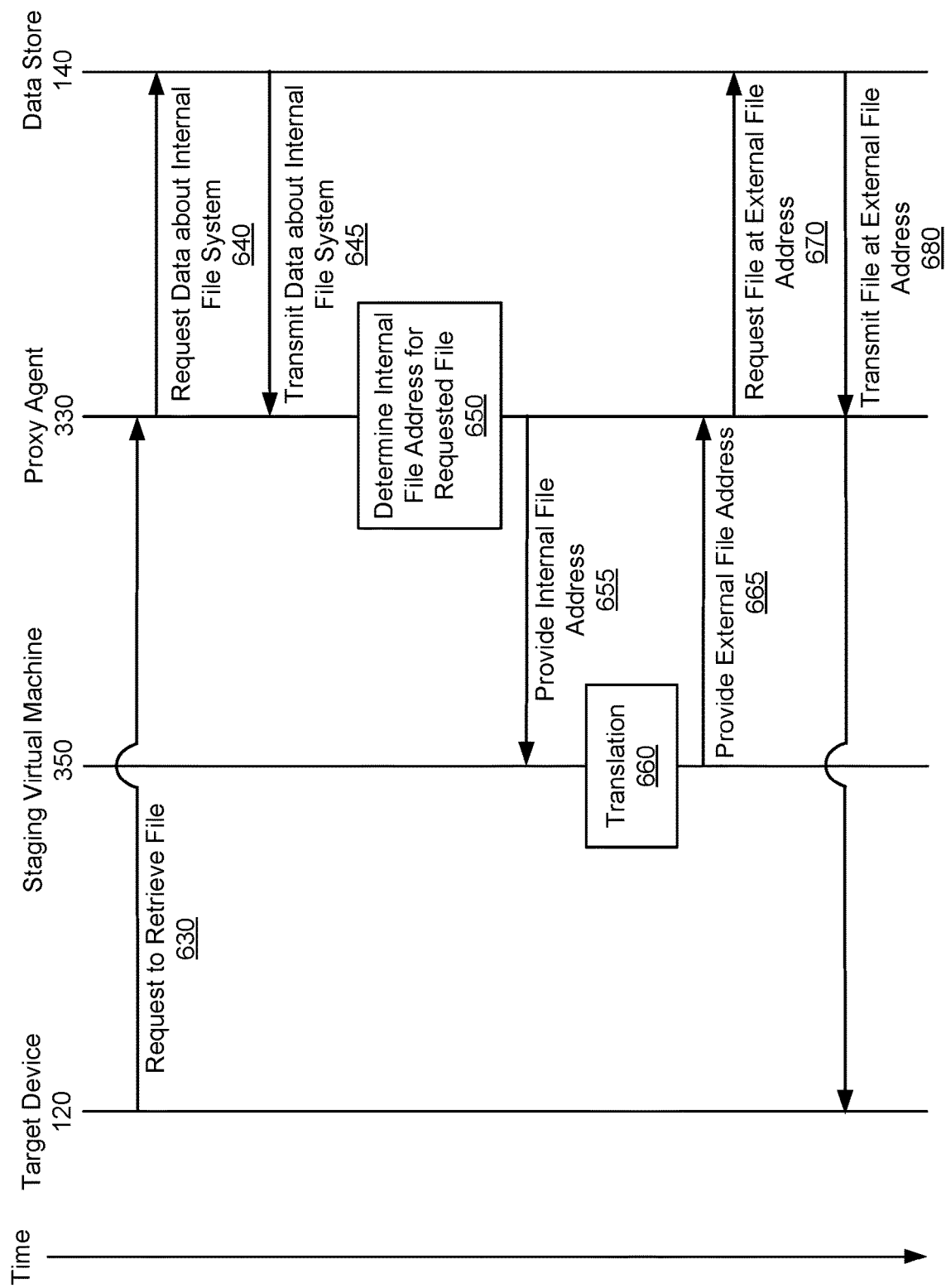
FIG. 6B is a transaction diagram illustrating interactions among a target device, a staging virtual machine, a proxy agent, and a data store during a retrieval process, in accordance with an embodiment.

FIG. 6B is a transaction diagram illustrating interactions among a target device 120, a staging virtual machine 350, a proxy agent 330, and a data store 140 during a retrieval process, in accordance with an embodiment. The staging virtual machine 350 and the proxy virtual machine 330 are components of the data management server 130.

The target device 120 may request 630 to retrieve a file. This request is sent to the proxy agent 330. The requested file is currently stored (i.e., previously backed up) in the data store 140. The proxy agent 330 requests 640 data about the internal file system from the data store 140. The data store 140 provides the data about the internal file system to the proxy agent 330. The internal file system may include metadata, information related to an internal file system of the client virtual machine (e.g., internal file address information), or other data related to the internal file system of the client virtual machine. The proxy agent 330 determines 650 the internal file address for the requested file. The proxy agent provides 655 the internal file address to the staging virtual machine 350. The staging virtual machine 350 translates 660 the internal file address to an external file address. An example embodiment of the translation 660 from internal file address to external file address is described in FIG. 7. The staging virtual machine 350 provides 665 the external file address to the proxy agent 330. The proxy agent 330 requests 670 the file stores at the external file address. The data store 140 transmits 680 the file stored at the external file address to the proxy agent 330. Additionally or alternatively, the data store 140 transmits 680 the requested file to the target device 120. In some embodiments, the data store that stores the data about the internal file system and the data store that stores the requested files are different data store, as shown in the embodiment in FIG. 4.

Example File Retrieval

FIG. 7 illustrates a file retrieval from a disk location, in accordance with an embodiment.

In an example embodiment, a data store (e.g., the data store 140) comprises a disk with disk locations 0 to 1000. The disk may be a 1 Gigabyte (GB) disk with each disk location corresponding to 1 Megabyte (MB). Each location may be associated with an external file address (e.g., a block address, a disk address, etc.).

In the example embodiment, at 8:00 pm on a client virtual machine, file A is stored in an internal file system (e.g., the internal file system 240). File A may be 4 MB with 1 MB of data stored at each individual file location 0 to 3. File location 0 may store data 'AA'. File location 1 may store data 'BB'. File location 2 may store data 'CC'. File location 3 may store data 'DD'. File A, which includes the data and the file locations, may be further indexed (i.e., stored) by volumes. For example, the internal file system may comprise two volumes (e.g., volume 1 and volume 2). During a backup process, volume 1 and volume 2 are stored on the disk. In this embodiment, data stored at file location 0 may be stored in volume 2 location 12. Data stored at file location 1 may be stored in volume 2 location 14. Data stored at file location 2 may be stored in volume 2 location 22. Data stored at file location 3 may be stored in volume 2 location 25. In this example, each location of the volume is an internal file address.

At 8:00 pm, the client virtual machine performs a backup. File A is backed up and stored in the data store. For instance, data 'AA' may be stored at external file address location (i.e., disk location) 512. In another example, data 'BB' may be stored at external file address location 514. Thus, at 8:00 pm, file A is stored at internal file address locations (i.e., volume locations) 12→14→22→25 and external file address locations 512→514→522→525.

In the example embodiment, at 8:05 pm a user of the client virtual machine edits file A. Specifically, the data 'BB' is changed to 'BC'. In this embodiment, the data 'BC' is now stored at file location 1 which still corresponds to volume 2 location 14. The data 'BB' is now stored at volume 2 location 30. At 8:05 pm, another backup process is performed. The data 'BB' may be stored at external file address location 530. Thus, at 8:05 pm, file A is stored at internal file address locations 12→30→22→25 and external file address locations 512→530→522→525.

In the example embodiment, at 8:10 pm the user of the client virtual machine or the user of a different machine (e.g., the target device 120) requests to retrieve the file (e.g., file A at 8:00 pm). The internal file address locations 12→30→22→25 are known. The external file address locations are not known. The internal file address locations may be translated to external file address locations by the data management server (e.g., by a staging virtual machine). In this embodiment, the internal file address locations include volume offset values and the external file address locations include disk offset values. The internal file address locations 12→30→22→25 are translated to the external file address locations 512→530→522→525. The data management server may request the file located at the external file address locations specifically. File A is retrieved from the data store and provided to the client virtual machine and/or the target device.

As can be seen in this example, only 4 MB of data is retrieved and/or restored as opposed to the whole 1 GB amount of data stored on the disk in the data store.

Computing Machine Architecture

FIG. 8 is a block diagram illustrating components of an example computing machine that is capable of reading instructions from a computer readable medium and execute them in a processor. A computer described herein may include a single computing machine shown in FIG. 8, a virtual machine, a distributed computing system that includes multiples nodes of computing machines shown in FIG. 8, or any other suitable arrangement of computing devices.

By way of example, FIG. 8 shows a diagrammatic representation of a computing machine in the example form of a computer system 800 within which instructions 824 (e.g., software, program code, or machine code), which may be stored in a computer readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 8 may correspond to any software, hardware, or combined components shown in FIGS. 1-4, including but not limited to, the client device 110, the data management server 130, and various engines, interfaces, terminals, and machines shown in FIG. 4. While FIG. 8 shows various hardware and software elements, each of the components described in FIGS. 1-4 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 824 that specify actions to be taken by that machine. Further, while only a single machine is illustrated, the term "machine" and "computer" also may be taken to include any collection of machines that individually or jointly execute instructions 824 to perform any one or more of the methodologies discussed herein.

The example computer system 800 includes one or more processors 802 such as a CPU (central processing unit), a GPU (graphics processing unit), a TPU (tensor processing unit), a DSP (digital signal processor), a system on a chip (SOC), a controller, a state equipment, an application-specific integrated circuit (ASIC), a field-programmable gate array (FPGA), or any combination of these. Parts of the computing system 800 also may include memory 804 that store computer code including instructions 824 that may cause the processors 802 to perform certain actions when the instructions are executed, directly or indirectly by the processors 802. Memory 804 may be any storage devices including non-volatile memory, hard drives, and other suitable storage devices. Instructions can be any directions, commands, or orders that may be stored in different forms, such as equipment-readable instructions, programming instructions including source code, and other communication signals and orders. Instructions may be used in a general sense and are not limited to machine-readable codes.

One and more methods described herein improve the operation speed of the processors 802 and reduces the space required for the memory 804. For example, the architecture and methods described herein reduce the complexity of the computation of the processors 802 by applying one or more novel techniques that simplify the steps generating results of the processors 802, and reduce the cost of restoring data. The algorithms described herein also reduce the storage space requirement for memory 804.

The performance of certain of the operations may be distributed among the more than processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations. Even though in the specification or the claims may refer some processes to be performed by a processor, this should be construed to include a joint operation of multiple distributed processors.

The computer system 800 may include a main memory 804, and a static memory 806, which are configured to communicate with each other via a bus 808. The computer system 800 may further include a graphics display unit 810 (e.g., a plasma display panel (PDP), a liquid crystal display (LCD), a projector, or a cathode ray tube (CRT)). The graphics display unit 810, controlled by the processors 802, displays a graphical user interface (GUI) to display one or more results and data generated by the processes described herein. The computer system 800 also may include alpha-numeric input device 812 (e.g., a keyboard), a cursor control device 814 (e.g., a mouse, a trackball, a joystick, a motion sensor, or other pointing instrument), a storage unit 816 (a hard drive, a solid state drive, a hybrid drive, a memory disk, etc.), a signal generation device 818 (e.g., a speaker), and a network interface device 820, which also are configured to communicate via the bus 808.

The storage unit 816 includes a computer readable medium 822 on which is stored instructions 824 embodying any one or more of the methodologies or functions described herein. The instructions 824 also may reside, completely or at least partially, within the main memory 804 or within the processor 802 (e.g., within a processor's cache memory) during execution thereof by the computer system 800, the main memory 804 and the processor 802 also constituting computer readable media. The instructions 824 may be transmitted or received over a network 826 via the network interface device 820.

While computer readable medium 822 is shown in an example embodiment to be a single medium, the term "computer readable medium" should be taken to include a single medium or multiple media (e.g., a centralized or distributed database, or associated caches and servers) able to store instructions (e.g., instructions 824). The computer readable medium may include any medium that is capable of storing instructions (e.g., instructions 824) for execution by the processors (e.g., processors 802) and that causes the processors to perform any one or more of the methodologies disclosed herein. The computer readable medium may include, but not be limited to, data repositories in the form of solid-state memories, optical media, and magnetic media.

The computer readable medium does not include a transitory medium such as a propagating signal or a carrier wave.

Additional Considerations

Beneficially, the systems and processes described herein improve the efficiency and reduce the cost of data retrieval and/or restoration. A large amount of data may be uploaded to a data store as a result of snapshots captured from numerous client devices. By providing a single snapshot to a client device, a data management system may decrease the costs associated with data restoration. Costs may be direct monetary costs to be spent to perform an action (e.g., read, write, store) or other costs such as computer resources and time in performing an action. The restoration of individual files, as opposed to entire disk snapshots, provides a less costly method for data restoration.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any feature mentioned in one claim category, e.g. method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter may include not only the combinations of features as set out in the disclosed embodiments but also any other combination of features from different embodiments. Various features mentioned in the different embodiments can be combined with explicit mentioning of such combination or arrangement in an example embodiment or without any explicit mentioning. Furthermore, any of the embodiments and features described or depicted herein may be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In one embodiment, a software engine is implemented with a computer program product comprising a computer readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure. Likewise, any use of (i), (ii), (iii), etc., or (a), (b), (c), etc. in the specification or in the claims, unless specified, is used to better enumerate items or steps and also does not mandate a particular order.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A. In claims, the use of a singular form of a noun may imply at least one element even though a plural form is not used.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A computer-implemented method, comprising:
  receiving a request for retrieving a file in a client virtual machine operated at one or more client devices, the client virtual machine having a backup that is stored in a data store different from the one or more client devices, wherein the file in the client virtual machine is indexed using an internal file system internal to the client virtual machine, and data blocks of the backup of the client virtual machine are stored in the data store that uses an external file system;
  importing data of the internal file system of the client virtual machine to a staging virtual machine;
  determining an internal file address of the file request, the internal file address being an address used by the internal file system that is run by the client virtual machine;
  translating, using the internal file system imported to the staging virtual machine, the internal file address to an external file address of the external file system used by the data store in which the data blocks of the backup of the client virtual machine are stored, wherein translating the internal file address to the external file address comprises:
    receiving a volume offset value, wherein the volume offset value indicates the internal file address in an internal volume, and converting, using the staging virtual machine, the volume offset value to a disk offset value, wherein the disk offset value indicates the external file address in the data store;

retrieving the file of the backup of the client virtual machine from the data store based on the external file address translated from the internal file address; and providing the retrieved file to a target device.

2. The computer-implemented method of claim 1, wherein translating the internal file address to the external file address comprises:

receiving an internal offset value, wherein the internal offset value indicates the internal file address; and converting, using the staging virtual machine, the internal offset value to an external offset value, the external offset value indicating the external file address in the data store.

3. The computer-implemented method of claim 1, wherein the request is received by a proxy agent that is running inside a Linux virtual machine and the staging virtual machine and the client virtual machine are both a Windows virtual machine.

4. The computer-implemented method of claim 1, wherein the request for retrieving the file is part of a request to restore an internal file system snapshot of the client virtual machine.

5. The computer-implemented method of claim 1, wherein the file is retrieved without the client virtual machine being in operation.

6. The computer-implemented method of claim 1, wherein the request for retrieving the file is part of a Structured Query Language (SQL) query.

7. The computer-implemented method of claim 1, wherein the data store is a cloud backup store that stores the data blocks of the client virtual machine as part of a backup image of the client virtual machine.

8. The computer-implemented method of claim 1, wherein the external file system uses a data block system.

9. A non-transitory computer readable medium storing computer code comprising instructions that, when executed by at least one processor, cause the at least one processor to:

receive a request for retrieving a file in a client virtual machine operated at one or more client devices, the client virtual machine having a backup that is stored in a data store different from the one or more client devices, wherein the file in the client virtual machine is indexed using an internal file system internal to the client virtual machine, and data blocks of the backup of the client virtual machine are stored in the data store that uses an external file system;

import data of the internal file system of the client virtual machine to a staging virtual machine;

determine an internal file address of the file request, the internal file address being an address used by the internal file system that is run by the client virtual machine;

translate, using the internal file system imported to the staging virtual machine, the internal file address to an external file address of the external file system used by the data store in which the data blocks of the backup of the client virtual machine are stored, wherein translating the internal file address to the external file address comprises:

receiving a volume offset value, wherein the volume offset value indicates the internal file address in an internal volume, and converting, using the staging virtual machine, the volume offset value to a disk offset value, wherein the disk offset value indicates the external file address in the data store;

retrieve the file of the backup of the client virtual machine from the data store based on the external file address translated from the internal file address; and provide the retrieved file to a target device.

10. The non-transitory computer readable medium of claim 9, wherein the instructions to translate the internal file address to the external file address comprises instructions to:

receive an internal offset value, wherein the internal offset value indicates the internal file address; and convert, using the staging virtual machine, the internal offset value to an external offset value, the external offset value indicating the external file address in the data store.

11. The non-transitory computer readable medium of claim 9, wherein the request is received by a proxy agent that is running inside a Linux virtual machine and the staging virtual machine and the client virtual machine are both a Windows virtual machine.

12. The non-transitory computer readable medium of claim 9, wherein the request for retrieving the file is part of a request to restore an internal file system snapshot of the client virtual machine.

13. The non-transitory computer readable medium of claim 9, wherein the request for retrieving the file is part of a Structured Query Language (SQL) query.

14. The non-transitory computer readable medium of claim 9, wherein the data store is a cloud backup store that stores the data blocks of the client virtual machine as part of a backup image of the client virtual machine.

15. The non-transitory computer readable medium of claim 9, wherein the external file system uses a data block system.

16. A system comprising:

a data store comprising memory configured to store data blocks of a client virtual machine, the data store using an external file system;

a proxy agent executed by a processor, the proxy agent configured to:

responsive to a request to retrieve a file in the client virtual machine operated at one or more client devices, import data of an internal file system of the client virtual machine to a staging virtual machine, the file being indexed using an internal file system internal to the client virtual machine; and determine an internal file address of the file request, the internal file address being an address used by the internal file system that is run by the client virtual machine; and the staging virtual machine configured to:

translate, using the internal file system imported to the staging virtual machine, the internal file address to an external file address of the external file system used by the data store in which the data blocks of backup of the client virtual machine are stored, wherein translating the internal file address to the external file address comprises:

receiving a volume offset value, wherein the volume offset value indicates the internal file address in an internal volume, and converting, using the staging virtual machine, the volume offset value to a disk offset value, wherein the disk offset value indicates the external file address in the data store;

retrieve the file of the backup of the client virtual machine from the data store based on the external file address translated from the internal file address; and provide the retrieved file to a target device.

17. The system of claim 16, wherein the staging virtual machine is further configured to:

receive an internal offset value, wherein the internal offset value indicates the internal file address; and convert the internal offset value to an external offset value, the external offset value indicating the external file address in the data store.

* * * * *